United States Patent
Juveneton et al.

(10) Patent No.: US 9,639,769 B2
(45) Date of Patent: May 2, 2017

(54) LIVENESS DETECTION

(71) Applicant: Accenture Global Services Limited, Dublin (IE)

(72) Inventors: Florian Juveneton, Nice (FR); Alessio Cavallini, Nice (FR)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 15/220,142

(22) Filed: Jul. 26, 2016

(65) Prior Publication Data

US 2016/0335515 A1    Nov. 17, 2016

Related U.S. Application Data

(63) Continuation of application No. 14/607,159, filed on Jan. 28, 2015, now Pat. No. 9,430,709, which is a
(Continued)

(30) Foreign Application Priority Data

Sep. 28, 2012  (EP) .................................... 12290323

(51) Int. Cl.
*G06K 9/00* (2006.01)
*G06K 9/46* (2006.01)
(Continued)

(52) U.S. Cl.
CPC ................. *G06K 9/46* (2013.01); *G06K 9/00* (2013.01); *G06K 9/00268* (2013.01);
(Continued)

(58) Field of Classification Search
CPC ..... G06K 9/00281; G06K 2009/00932; G06K 9/00248; G06K 9/00604; G06K 9/00906;
(Continued)

(56) References Cited

U.S. PATENT DOCUMENTS 6,173,068 B1    1/2001  Prokoski
7,263,220 B2    8/2007  Crandall
(Continued)

OTHER PUBLICATIONS

Extended European Search Report in European Application No. 12290323.0, dated Mar. 15, 2013, 9 pages.
(Continued)

*Primary Examiner* — Vu Le
*Assistant Examiner* — Aklilu Woldemariam
(74) *Attorney, Agent, or Firm* — Fish & Richardson P.C.

(57) ABSTRACT

An image of a portion of a person's body is accessed, the image having been captured by an image capture device. Using the image, measurements of characteristics in the image are obtained, the characteristics in the image having been selected based on a statistical analysis of characteristics (i) in a plurality of first images taken directly of a person and (ii) in a plurality of second images taken of an image of a person. Based on a liveness function, a score for the image is determined using the obtained measurements of the characteristics in the image. A threshold value is accessed. The score of the image is compared to the accessed threshold value. Based on the comparison of the score of the image to the accessed threshold value, the image is determined to be have been taken by the image capture device imaging the portion of the person's body.

18 Claims, 11 Drawing Sheets

Related U.S. Application Data continuation of application No. 13/685,965, filed on Nov. 27, 2012, now Pat. No. 8,958,607.

(51) Int. Cl.

| | | |
|---|---|---|
| *G06T 7/20* | (2017.01) | |
| *G06N 99/00* | (2010.01) | |
| *G06T 11/80* | (2006.01) | |
| *H04N 5/225* | (2006.01) | |
| *G06T 7/77* | (2017.01) | |

(52) U.S. Cl.
CPC ..... *G06K 9/00295* (2013.01); *G06K 9/00624* (2013.01); *G06K 9/00906* (2013.01); *G06N 99/005* (2013.01); *G06T 7/20* (2013.01); *G06T 7/77* (2017.01); *G06T 11/80* (2013.01); *H04N 5/225* (2013.01)

(58) Field of Classification Search
CPC ........... G06K 9/00221; G06K 9/00295; G06K 9/00677; G06K 9/6211; G06K 9/00617; G06K 9/00275; G06K 2209/23; G06K 9/6202; G06K 9/00; G06K 9/00624; G06K 9/00268; G06K 9/46; G06K 9/00288; G06K 9/627; A61B 5/117; A61B 5/7264; H04N 1/0044; H04N 2101/00; H04N 2201/0084; H04N 5/23222; H04N 5/23245; H04N 5/907; H04N 9/8047; H04N 9/8063; H04N 9/8205; H04N 9/8227; H04N 5/272; H04N 5/2723; H04N 5/225; G06F 17/30047; G06F 3/017; G06T 7/0048; G06T 7/0097; G06T 7/0042; G06T 7/20; G06T 11/80; G06T 7/77; H04L 9/3231; G11B 27/034; G11B 27/105; G11B 27/34; A63F 2300/663; A63F 2300/6692; A63F 2300/69; G06N 99/005; G06N 7/005
USPC ....... 382/103, 115, 118, 120, 124, 125, 165, 382/217, 220
See application file for complete search history.

(56) References Cited

U.S. PATENT DOCUMENTS

| | | | |
|---|---|---|---|
| 7,529,411 | B2 | 5/2009 | Haupt |
| 8,290,281 | B2 | 10/2012 | Xiao |
| 8,331,632 | B1 | 12/2012 | Mohanty |
| 8,958,607 | B2 | 2/2015 | Juveneton |
| 9,154,727 | B2* | 10/2015 | Sato ................... H04N 1/00127 |
| 2002/0132663 | A1 | 9/2002 | Cumbers |
| 2004/0061796 | A1* | 4/2004 | Honda ................... H04N 1/00 348/297 |
| 2004/0170318 | A1 | 9/2004 | Crandall |
| 2005/0004897 | A1 | 1/2005 | Lipson |
| 2005/0018894 | A1* | 1/2005 | Couwenhoven ........ G06T 5/004 382/132 |
| 2006/0067573 | A1* | 3/2006 | Parr ................... G06K 9/00275 382/154 |
| 2006/0204107 | A1 | 9/2006 | Dugan |
| 2006/0274921 | A1 | 12/2006 | Rowe |
| 2007/0098303 | A1 | 5/2007 | Gallagher |
| 2007/0127787 | A1 | 6/2007 | Castleman |
| 2008/0170129 | A1* | 7/2008 | Yi ....................... H04N 5/23212 348/208.12 |
| 2008/0212899 | A1 | 9/2008 | Gokturk |
| 2009/0060288 | A1 | 3/2009 | Myers |
| 2009/0136100 | A1 | 5/2009 | Shinohara |
| 2010/0253801 | A1* | 10/2010 | Konishi ............... G11B 27/034 348/222.1 |
| 2011/0074971 | A1* | 3/2011 | Kwon ................. H04N 5/23245 348/222.1 |
| 2011/0267259 | A1* | 11/2011 | Tidemand ............... A63F 13/98 345/156 |
| 2012/0002880 | A1 | 1/2012 | Lipson |
| 2012/0121193 | A1 | 5/2012 | Lipson |
| 2012/0200689 | A1 | 8/2012 | Friedman |
| 2012/0200729 | A1* | 8/2012 | Hoda ................... H04N 5/23293 348/222.1 |
| 2013/0113941 | A1* | 5/2013 | Yoneyama ............. H04N 5/232 348/169 |
| 2013/0215319 | A1* | 8/2013 | Tomita ..................... G02B 7/28 348/345 |
| 2013/0242140 | A1* | 9/2013 | Uemura .............. G06K 9/00228 348/239 |
| 2014/0109023 | A1* | 4/2014 | Murillo ................... G06F 3/017 715/863 |
| 2014/0369611 | A1* | 12/2014 | Takeuchi ........... G06K 9/00228 382/224 |
| 2014/0376813 | A1* | 12/2014 | Hongu ............... G06K 9/00228 382/195 |
| 2015/0139497 | A1 | 5/2015 | Juveneton |
| 2015/0253845 | A1* | 9/2015 | Kempinski ............. G06F 3/013 345/156 |

OTHER PUBLICATIONS

Bai et al., "Is physics-based liveness detection truly possible with a single image?" IEEE International Symposium on circuits and Systems, 2010, 3425-3428.
Kollreider et al., "Verifying liveness by multiple experts in face biometrics," IEEE Computer Society Conference on Computer Vision and Pattern Recognition Workshops, 2008, 1-6.
Li et al., "Live face detection based on the analysis of Fourier spectra," Proceedings of Spie, 2004, 5404:296-303.
Schwartz et al., "Face spoofing detection through partial least squares and low-level descriptors," International Joint Conference on Biometrics (IJCB)—IEEE, 2011, 1-8.
Tan et al., "Face liveness detection from a single image with sparse low rank bilinear Discriminative Model," 11th European Conference on Computer Vision—ECCV, 2010, 504-517.
Zhang et al., "Face liveness detection by learning multispectral reflectance distributions," IEEE International Conference on Automatic Face & Gesture Recognition and Workshops, 2011, 436-441.
U.S. Non-Final Office Action for U.S. Appl. No. 13/685,965 dated May 8, 2014, 17 pages.
U.S. Notice of Allowance for U.S. Appl. No. 13/685,965 dated Oct. 7, 2014, 10 pages.
U.S. Notice of Allowance for U.S. Appl. No. 14/607,159, dated Jul. 7, 2016, 15 pages.

* cited by examiner

| | x1 | x2 | x3 | x4 | x5 | x6 | x7 | x8 | x9 | x10 | x11 | x12 | x13 | x14 | |
|---|---|---|---|---|---|---|---|---|---|---|---|---|---|---|---|
| Face ID | age | chin | crown | deviation | deviation | exposure | eye0Gaze | eye0Open | eye0Red | eye0Tint | eye1Gaze | eye1Open | eye1Red | eye1Tint | Type |
| 1 | 39 | 259 | 223.8 | 1.634974 | 3.618067 | 119.556 | -0.3423 | 1.885073 | 0 | -20.3397 | 1.06144 | 3.300936 | 0 | -13.8651 | LIVE |
| 2 | 48 | 248 | 247.9 | 1.196615 | 0.491554 | 119.7715 | -1.15493 | -0.923346 | 0 | -37.3456 | -0.38737 | 0.570099 | 0 | -36.8844 | LIVE |
| 3 | 49 | 241 | 256.4 | 0.3906 | 1.420439 | 109.4897 | -0.57497 | 0.46147 | 0 | -36.5256 | -0.02013 | 1.031715 | 0 | -39.1354 | LIVE |
| 4 | 48 | 234 | 248.4 | -0.462229 | 1.078064 | 100.9511 | -1.44468 | -0.2564 | 0 | -30.1677 | 0.533918 | 1.268751 | 0 | -30.1856 | LIVE |
| 5 | 51 | 223 | 237.7 | -0.052131 | 2.021523 | 91.4838 | -1.38793 | -0.500092 | 0 | -18.9232 | 0.268905 | 1.738492 | 0 | -20.9095 | LIVE |
| 6 | 51 | 223 | 228.5 | -0.133174 | 2.85426 | 90.2376 | -1.35128 | -0.591129 | 0 | -17.0518 | 0.2216404 | 1.833629 | 0 | -20.5781 | LIVE |
| 7 | 31 | 195 | 169.9 | -1.367831 | 3.610226 | 63.07411 | -0.62797 | -1.616928 | 0 | 4.692029 | 1.47263 | 3.089484 | 0 | 4.48369 | FAKE |
| 8 | 47 | 218 | 228.7 | -0.121804 | 2.380034 | 88.78481 | -1.35083 | -0.48727 | 0 | -14.642 | 0.149986 | 1.97853 | 0 | -37.9085 | FAKE |
| 9 | 33 | 179 | 168.2 | 0.408068 | 5.68898 | 92.77769 | -0.61022 | 1.548018 | 0 | -29.2314 | 0.70974 | 2.815082 | 0 | -44.8631 | FAKE |
| 10 | 50 | 222 | 224.3 | -0.1107 | 3.797185 | 107.3626 | -1.20619 | -0.01925 | 0 | -13.0342 | 0.799539 | 2.306293 | 0 | -11.8842 | FAKE |
| 11 | 51 | 224 | 226.7 | -0.4733218 | 2.8320019 | 105.502 | -1.36723 | -0.397738 | 0 | -20.3807 | 0.646203 | 2.102257 | 0 | -23.0036 | FAKE |
| 12 | 50 | 219 | 230.8 | 0.581425 | 2.843305 | 101.0607 | -2.18909 | 0.351024 | 0 | -28.2619 | -0.22616 | 1.901964 | 0 | -31.7045 | FAKE |

FIG. 5

LIVENESS DETECTION

CROSS-REFERENCE TO RELATED APPLICATIONS

This application is a continuation (and claims the benefit of priority under 35 USC 120) of U.S. application Ser. No. 14/607,159, filed Jan. 28, 2015, now allowed, which is a continuation of U.S. application Ser. No. 13/685,965, filed Nov. 27, 2012, now U.S. Pat. No. 8,958,607, issued Feb. 17, 2015, which claims priority to European Patent Application No. 12290323.0, filed on Sep. 28, 2012, entitled "LIVENESS DETECTION," the entirety of which are hereby incorporated by reference.

This disclosure relates to biometric authentication technology.

BACKGROUND

A typical biometric authentication system includes a database of biometric information (e.g., fingerprints, retina scans, facial images, etc.) about individuals. To identify or authenticate a sample of biometric information, the typical biometric matching system compares the sample with entries in the database.

SUMMARY

In one aspect, a system includes at least one processor and at least one memory coupled to the at least one processor having stored thereon instructions which, when executed by the at least one processor, causes the at least one processor to perform operations. The operations include accessing an image of a portion of a person's body, the image having been captured by an image capture device; obtaining, using the image, measurements of characteristics in the image, the characteristics in the image having been selected based on a statistical analysis of characteristics (i) in a plurality of first images taken directly of a person and (ii) in a plurality of second images taken of an image of a person; determining, based on a liveness function, a score for the image using the obtained measurements of the characteristics in the image; accessing, from the computer storage medium, a threshold value; comparing the score of the image to the accessed threshold value; and based on the comparison of the score of the image to the accessed threshold value, determining that the image was taken by the image capture device imaging the portion of the person's body.

In another aspect, a method may include one or more of the operations described above. In yet another aspect, a computer-readable storage medium may be operable to cause a processor to perform one or more of the operations described above.

Implementations may include one or more of the following features. For example, the operations may further include accessing a different image of a portion of another person's body, the different image having been captured by the image capture device; obtaining, using the different image, measurements of characteristics in the different image, the characteristics in the different image having been selected based on the statistical analysis of characteristics (i) in the plurality of first images taken directly of a person and (ii) in the plurality of second images taken of an image of a person; determining, based on the liveness function, a score for the different image using the obtained measurements of the characteristics in the different image; accessing, from the computer storage medium, the threshold value; comparing the score of the different image to the accessed threshold value; and based on the comparison of the score of the different image to the accessed threshold value, determining that the different image was taken by the image capture device imaging another image of the portion of the person's body.

The operations may further include based on determining that the image was taken by the image capture device imaging another image of the portion of the person's body, confirming, based on human input, that the image was taken by the image capture device imaging another image of the portion of the person's body. The portion of the person's body can be a face of the person. The statistical analysis of characteristics (i) in the plurality of first images taken directly of a person and (ii) in the plurality of second images taken of an image of a person can include: generating, based on a linear regression analysis, a data model of characteristics (i) in the plurality of first images taken directly of a person and (ii) in the plurality of second images taken of an image of a person.

The operations may further include determining that a count of images (i) determined to be an image of a portion of a person's body taken directly by the image capture device or (ii) determined to be an image of an image of a portion of a person's body taken by the image capture device satisfies a threshold count, each of the images corresponding to a unique person; and based on determining that the count of images satisfies the threshold count, generating a second data model of the characteristics based on a second linear regression analysis.

The operations may further include determining, based on the linear regression analysis, respective weights for one or more of the obtained measurements of the characteristics in the image; and assigning the respective weights to the obtained measurements of the characteristics in the image. The weights can be based on regression coefficients associated with the data model. The determining, based on the liveness function, the score for the image using the obtained measurements of the characteristics in the image can include: weighting the obtained measurements of the characteristics using their respective weights; and aggregating weighted measurements of characteristics. Weighting the obtained measurements of the characteristics using their respective weights can include multiplying the obtained measurements of the characteristics with their respective weights, and wherein aggregating weighted measurements of characteristics comprises adding the weighted measurements of characteristics.

The threshold value can be determined based on an analysis of (i) first scores computed using the liveness function for images taken directly of a person and (ii) second scores computed using the liveness function for images taken of an image of a person. The score of the image can be used to determine that the image was taken by the image capture device imaging the portion of the person's body. The characteristics can include one or more of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, pose angle roll, a presence of hot spots, background uniformity measure, deviation from uniform lighting, average image exposure, gray scale image density, image sharpness, or average luminosity.

The details of one or more implementations are set forth in the accompanying drawings and the description, below.

Other potential features of the disclosure will be apparent from the description and drawings, and from the claims.

BRIEF DESCRIPTION OF THE DRAWINGS

FIG. 5 illustrates an exemplary data structure for storing data describing images.

DETAILED DESCRIPTION

Figure 1:
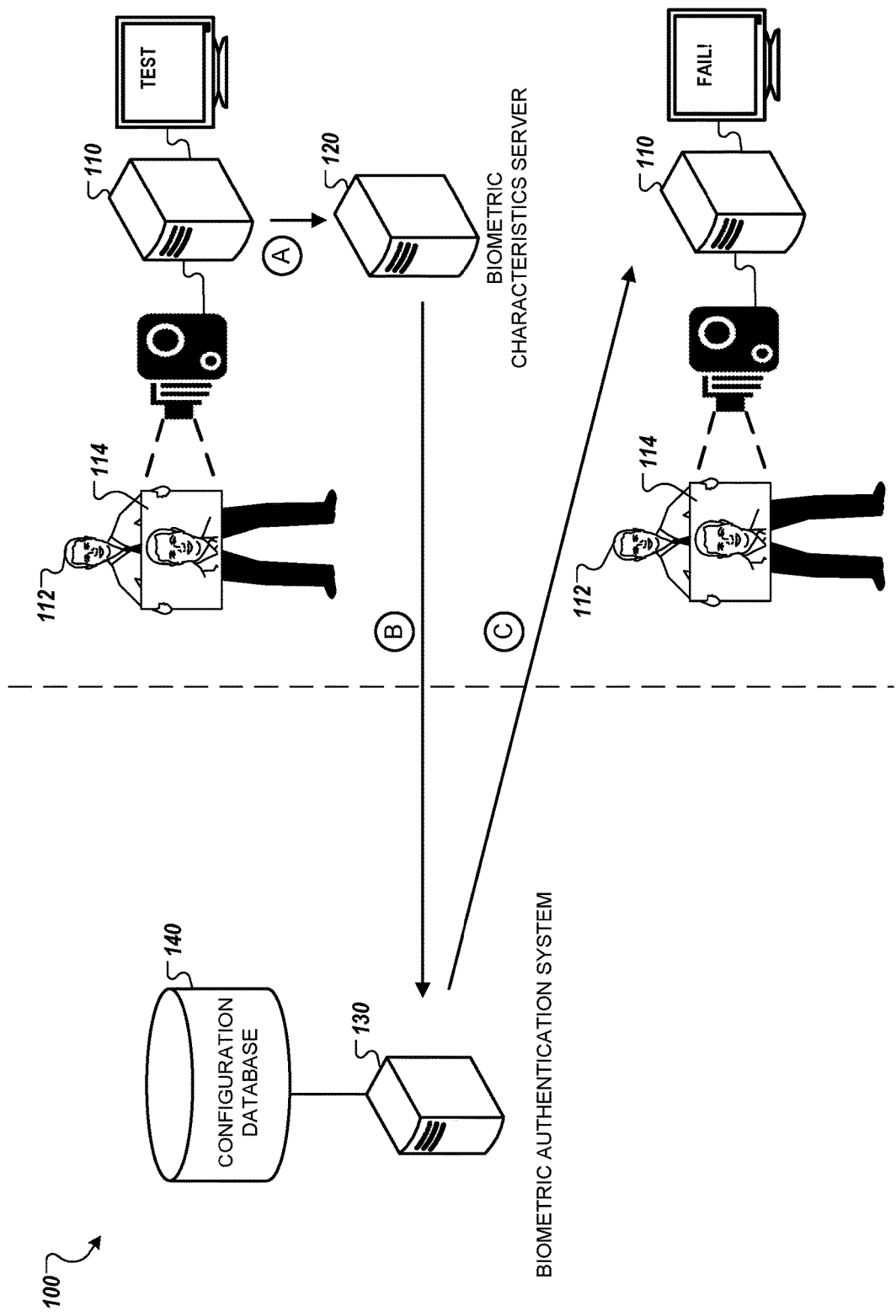
FIG. 1 is a diagram of an exemplary process.

In some implementations, a statistical approach that leverages biometric recognition technology is used to determine whether an image (i) is an image of a portion of a person's body taken directly by an image capture device, e.g., is an image of a live person positioned in front of the image capture device, or (ii) is an image that was taken by the image capture device imaging another image of a portion of a person's body, e.g., is an image of a photograph of a person. As used in this specification, the term "live image" refers to an image of a portion of a person's body taken directly by an image capture device, e.g., an image of a person positioned in front of the image capture device. The term "fabricated image" refers to an image that was taken by the image capture device imaging another image of a portion of a person's body. For example, a fabricated image can refer to an image that is an image of a photograph of a person's face, an image that is an image of a video frame of a person's face, or an image that is an image of an article, e.g., a t-shirt or shopping bag, that is imprinted with an image a person's face.

The statistical approach involves applying a statistical analysis to a first collection of data that describes measurements of characteristics in live images and a second collection of data that describes measurements of the same characteristics in fabricated images. Some examples of characteristics that can be measured include eye coordinates, eye gaze, and mouth opening.

As described below, the statistical analysis can be used to identify characteristics that are relevant for determining whether an image is a live image or a fabricated image. For example, the statistical analysis can be applied to measurements of the characteristics eye gaze, eye distance, chin position, and image sharpness taken from live and fabricated images. Based on the statistical analysis, the characteristics eye gaze and image sharpness may be identified as characteristics that are relevant for discriminating between a live image and a fabricated image while the characteristics eye distance and chin position may not. Accordingly, when determining whether a new image is a live image or a fabricated image, a system can be configured to assess the relevant characteristics, e.g., eye gaze and image sharpness, and to not assess characteristics that were not identified as being relevant, e.g., eye distance and chin position.

Further, the statistical analysis can be used to determine how much a particular characteristic should be weighted relative to other characteristics in determining whether an image is a live image or a fabricated image. For example, the statistical analysis can be used to determine that eye gaze should be assigned a numerical weight of 0.3 and that image sharpness should be assigned a numerical weight of 0.2.

In some implementations, a liveness score is computed for each image that is captured by an image capture device based on respective measurements of the relevant characteristics and their corresponding weights. An image can be classified as a live image or a fabricated image depending on whether the liveness score for the particular image satisfies a threshold liveness score.

FIG. 1 illustrates an example process 100 for determining whether an image is a live image or a fabricated image. As shown, a person 112 is holding a photograph 114 of a face in front of an image capture system 110. The image capture system 110 captures an image of the photograph 114.

The image capture system 110 communicates data describing the image of the photograph 114 to a biometric characteristics server 120. The biometric characteristics server 120 measures characteristics that are present in the image. For example, in some implementations, for an image that includes a person's face, the biometrics characteristics server 120 can measure the following characteristics: estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. In some implementations, the biometrics characteristics server 120 measures the following characteristics: a presence of hot spots, e.g., portions in the image having unusually bright spots, background uniformity measure, deviation from uniform lighting, average image exposure, gray scale image density, image sharpness, and average luminosity.

In some implementations, the biometric characteristics server 120 selectively measures, in the image, characteristics that were identified, based on the statistical analysis, as being relevant characteristics for determining whether an image is a live image or a fabricated image, as described below. The types of characteristics listed above are provided as examples. In particular, the techniques described in this specification can be applied to any characteristic that can be measured in an image.

The biometric characteristics server 120 communicates the measurements of the characteristics to a biometric authentication system 130. The biometric authentication system 130 is configured to access a configuration database 140. The configuration database 140 can store data describing a statistical data model, as determined by the statistical analysis, for use in determining whether an image is a live image or a fabricated image. For example, the configuration database 140 can store data describing characteristics that are relevant for determining whether an image is a live image or a fabricated image, together with their respective weights. Additionally, the configuration database 140 can store data describing a threshold liveness score for use in determining whether an image is a live image or a fabricated image.

Using the measurements of the characteristics in the image, the biometric authentication system 130 computes, based on a liveness function, a liveness score for the image.

In some implementations, when computing the liveness score, the biometric authentication system 130 can (i) multiply respective weights and their corresponding measurements of characteristics and (ii) aggregate the weighted measurements of characteristics.

The biometric authentication system 130 compares the liveness score of the image to the threshold liveness score and, based on the comparison, the biometric authentication system 130 can determine that the image of the photograph 114 is a fabricated image. The biometric authentication system 130 can communicate this result to the image capture system 110. Based on this result, the image capture system 110 can flag the image as a fabricated image.

Figure 2:
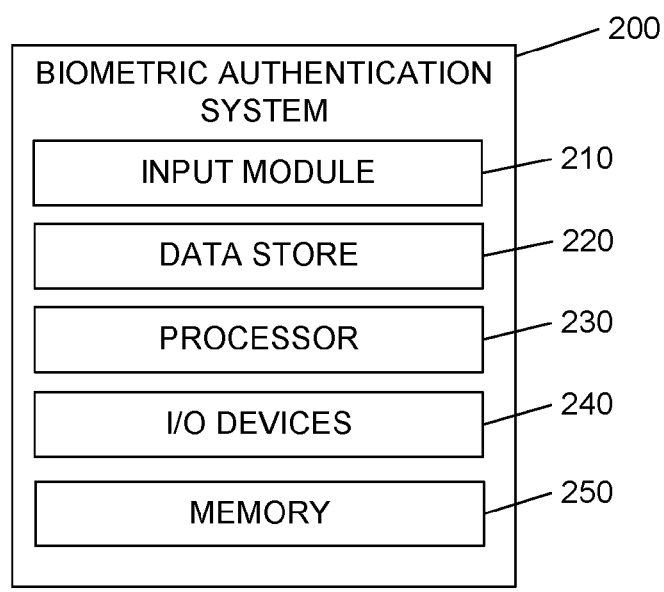
FIGS. 2 and 11 are diagrams of exemplary systems.

FIG. 2 illustrates an exemplary biometric authentication system 200. The system 200 includes an input module 210, a data store 220, one or more processors 230, one or more I/O (Input/Output) devices 240, and memory 250. The input module 220 may be used to input any type of information used in enrolling and verifying biometric data. For example, the input module 210 may be used to receive new biometric data to enroll in a database or receive sample biometric data to verify against biometric data stored in a database. In some implementations, data from the input module 210 is stored in the data store 220. The data included in the data store 220 may include, for example, any type of biometric data (e.g., images of irises, fingerprints, faces, etc.).

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
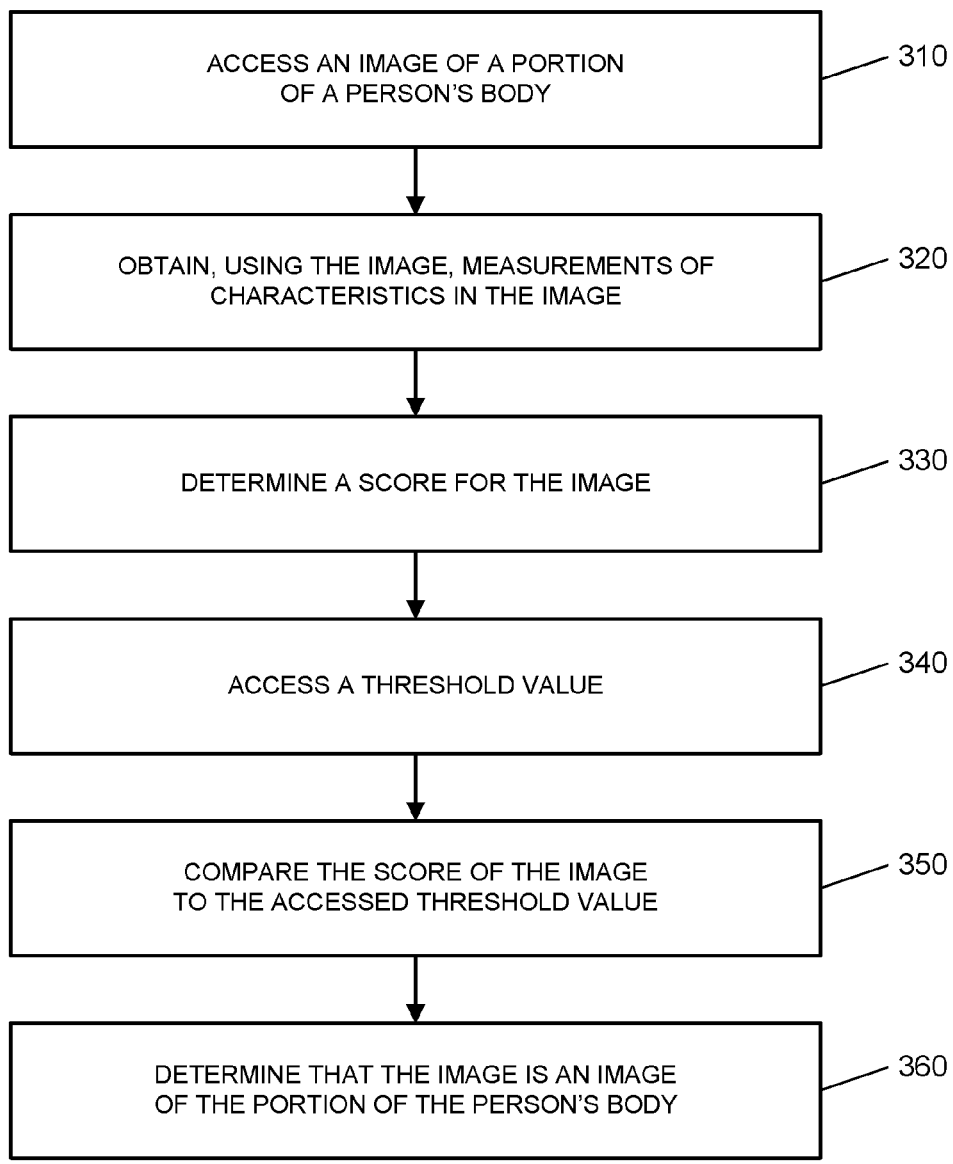
FIG. 3 illustrates an exemplary process for determining whether an image is a live image or a fabricated image.

FIG. 3 illustrates a process 300 for determining whether an image is a live image or a fabricated image. The operations of the process 300 are described generally as being performed by the system 200. In some implementations, operations of the process 300 may be performed by one or more processors included in one or more electronic devices.

The system 200 accesses an image of a portion of a person's body (310). For example, the system 200 receives a biometric image of a person's body part, such as a left iris image, a right iris image, a facial image, an image of any one or more of the person's fingerprints, an image of the person's handprint, etc. In this example, the system 200 may include or communicate with one or more devices that capture biometric images. The one or more devices may include iris scanners, cameras, fingerprint scanners, hand scanners, or any other type of device capable of capturing a biometric image. The system 200 may access the output of any of the one or more devices as the biometric image, in a traditional image format, such as bmp, jpeg, tiff, png, etc.

In some examples, the system 200 accesses the biometric image from data store 220. In these examples, biometric images may be captured over time at a location separate from the system 200 and stored for later processing and identification. The system 200 also may receive the biometric image over a network.

The system 200 obtains measurements of characteristics that are present in the image (320). The system 200 can obtain measurements of characters using, for example, one or more software development kits (SDK) that implement processes for measuring features, e.g., facial features. For example, for a facial image, the system 200 can obtain measurements of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. The system 200 can also obtain measurements of other characteristics that are present in the image, including a measurement of hot spots, background uniformity, deviation from uniform lighting, average image exposure, gray scale image density, image sharpness, and average luminosity.

The types of characteristics listed above are provided as examples. In particular, the techniques described in this specification can be applied to any characteristic that can be measured in an image. In some implementations, the system 200 obtains measurements of characteristics in the image that were determined, based on a statistical analysis, as being relevant for determining whether a particular is a live image or a fabricated image, as described in reference to FIG. 4.

The system 200 determines a liveness score for the image (330). For example, the system 200 can compute a liveness score for the image by multiplying or adding the obtained measurements of characteristics that are present in the image. One example liveness function used to determine a liveness score is reproduced below:

$$\text{Liveness Score} = M_1 * M_2 \ldots * M_n \quad \text{(Equation 1)}$$

where $M_1$ is a measurement for a first characteristic, $M_2$ is a measurement for a second characteristic, and $M_n$ is a measurement for an nth characteristic. The measurements $M_1$, $M_2$, and $M_n$ may be measurements of characteristics that were determined to be relevant based on a statistical analysis, as described below in reference to FIG. 4.

In some implementations, the system 200 determines a liveness score for the image by multiplying the measurements of characteristics with their respective weights and aggregating, e.g., adding, the weighted measurements of characteristics together. Weights for characteristics can be determined based on a statistical analysis, as described below in reference to FIG. 4. Another example of a liveness function used to determine a liveness score is reproduced below:

$$\text{Liveness Score} = (w_1 * M_1) + (w_2 * M_2) + \ldots + (w_n * M_n) \quad \text{(Equation 2)}$$

where $M_1$ is a measurement for a first characteristic, $w_1$ is a weight corresponding to the first characteristic, $M_2$ is a measurement for a second characteristic, $w_2$ is a weight corresponding to the second characteristic, $M_n$ is a measurement for an nth characteristic, and $w_n$ is a weight corresponding to the nth characteristic.

The system 200 accesses a threshold liveness score (340). For example, the system 200 accesses the threshold liveness score from data store 220. The threshold liveness score can be determined based on an analysis of liveness scores for live images and fabricated images, as described in reference to FIG. 7.

The system 200 compares the computed liveness score for the image to the threshold liveness score (350). For instance, the system 200 compares the computed liveness score to the threshold liveness score and determines whether the computed liveness score is less than, equal to, or greater than the threshold liveness score.

The system 200 determines, based on the comparison, whether the image is a live image or a fabricated image (360). For example, depending on the implementation, the system 200 can determine that the image is a live image based on a determination that the liveness score for the image is greater than or equal to the threshold liveness score. In this example, the system 200 can determine that the image is a fabricated image based on a determination that the liveness score for the image is less than the threshold liveness score. A threshold liveness score can be determined based on an analysis of liveness scores for live images and liveness scores for fabricated images, as described below in reference to FIG. 7.

Figure 4:
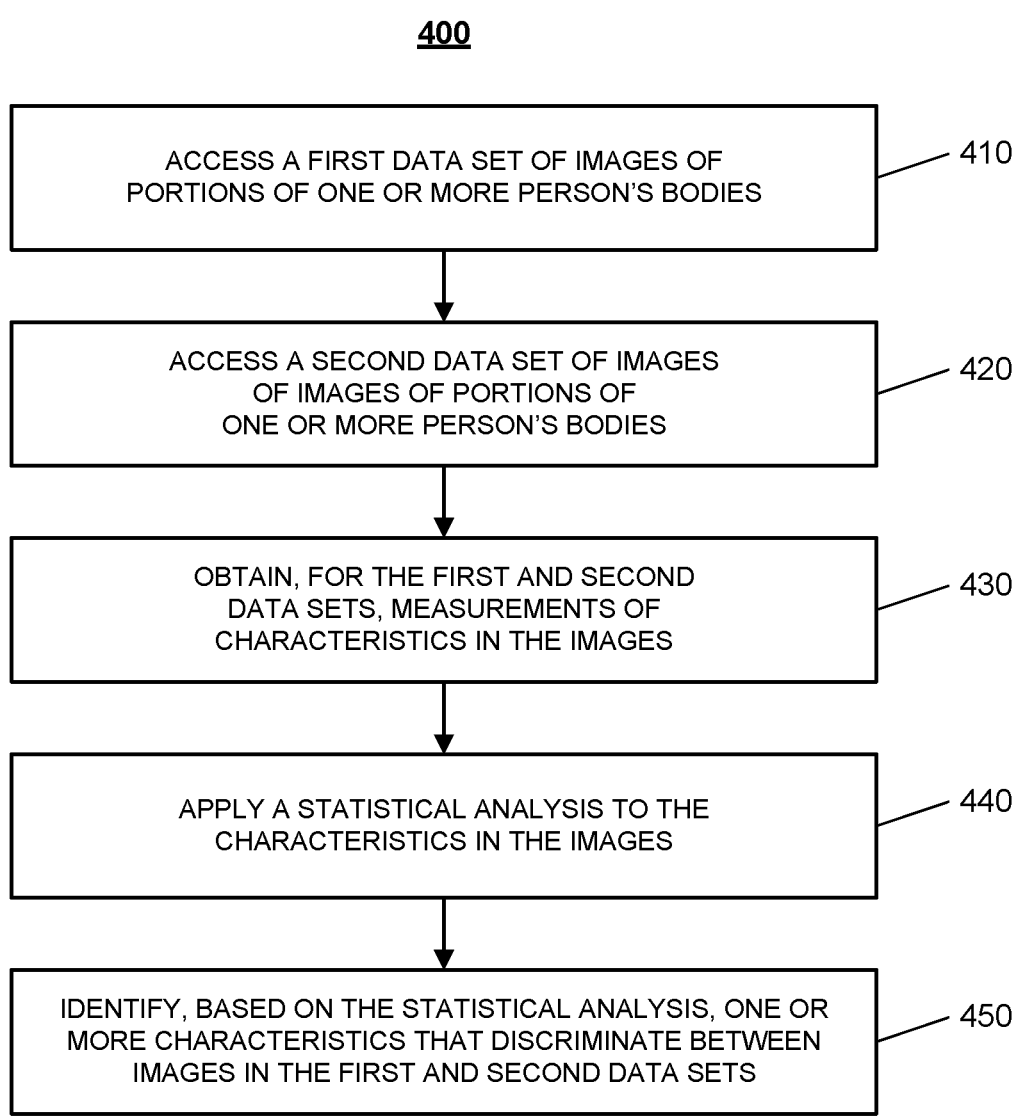
FIG. 4 illustrates an exemplary process for determining relevant characteristics.

FIG. 4 illustrates a process 400 for determining characteristics that are relevant for determining whether an image is a live image or a fabricated image. The operations of the process 400 are described generally as being performed by the system 200. In some implementations, operations of the process 400 may be performed by one or more processors included in one or more electronic devices.

The system 200 accesses a first data set of example live biometric images (410). For example, the system 200 obtains, from data store 220, biometric images of persons' body parts, such as a left iris image, a right iris image, a facial image, an image of any one or more of the person's fingerprints, an image of the person's handprint, etc. In this example, the biometric images may be captured by one or more devices. The one or more devices may include iris scanners, cameras, fingerprint scanners, hand scanners, or any other type of device capable of capturing a biometric image of a portion of a person's body.

The system 200 accesses a second data set of example fabricated biometric images (420). For example, the system 200 obtains, from data store 220, biometric images that were captured by one or more devices imaging other images of persons' body parts, such as a left iris image, a right iris image, a facial image, an image of any one or more of the person's fingerprints, an image of the person's handprint, etc. The one or more devices may include iris scanners, cameras, fingerprint scanners, hand scanners, or any other type of device capable of capturing a biometric image of a portion of a person's body.

In some implementations, example images capturing portions of persons' bodies are included in the first and second data based on the type of portion being analyzed. For example, the first and second data sets will include live and fabricated images, respectively, that capture faces of persons when identifying which facial characteristics are relevant for determining whether a facial image is a live image or a fabricated image. Depending on the implementation, the images included in the first and second data sets can be different live and fabricated images of the same person or live and fabricated images of different persons.

The system 200 obtains, for each image in the first and second data sets, measurements of characteristics in the images (430). The system 200 can obtain measurements of characteristics using, for example, one or more software development kits (SDK), as described above in reference to FIG. 3. The measurements of characteristics for images in the first and second data sets can be collected and stored, for example, in data store 220, as described in reference to FIG. 5.

As shown in FIG. 5, data 500 describing the example images in the first and second data sets can be stored in the data store 220, e.g., in a database. In some implementations, for each example image in the first and second data sets, the system 200 stores, in the database, a respective image identifier 510, e.g., a unique identifier for identifying a particular image, respective measurements 520 of one or more characteristics that are in the example image, and a respective indicator 530 that indicates whether the example image is a live image or a fabricated image. The respective indicator 530 can be determined based on which data set includes the example image. For example, as described above, the first and second data sets can be organized so that example live images are included in the first data set and example fabricated images are included in the second data set. Thus, depending on the data set corresponding to an example image, the indicator 530 for an example image can be set to specify that the example image is a live image, e.g., as a "live" or "1" flag, or that the example image is a fabricated image, e.g., as a "fake" or "0" flag.

Referring again to FIG. 4, the system 200 applies a statistical analysis to measurements of the characteristics in the example images in the first and second data sets (440). In some implementations, the system 200 applies a linear regression analysis to measurements of the characteristics captured by the example images in the first and second data sets. The linear regression analysis is configured to generate a data model that models a relationship between measurements of characteristics in images and whether the images are live images or fabricated images.

The system 200 can model this relationship by analyzing a $<x_1 \ldots x_n, y>$ data pair for each example image in the first and second data sets, where $x_1 \ldots x_n$ each represent a respective measurement of a characteristic in an example image, and where y represents whether the example image is a live image or a fabricated image.

By way of illustration, FIG. 5 shows respective measurements of characteristics 520 for each example image labeled as $x_1 \ldots x_{14}$ and the indicator 530, which indicates whether the example image is a live image or a fabricated image, labeled as y. Thus, for each example image, the measurements $x_1 \ldots x_{14}$ and the indicator y can be treated as a data pair $<x_1, \ldots, x_{14}, y>$.

The linear regression analysis models the data pairs using a linear predictor function. A linear predictor function can be a linear function, e.g., a linear combination, that is constructed from a set of terms. Each term in the linear combination can be multiplied by a coefficient, e.g., a regression coefficient. An example linear function is ax+by+ cz, where a, b, and c are coefficients, and where x, y, and z are terms. The terms in a linear combination, e.g., x, y, and z, correspond to characteristics that are measured in images in the first and second data sets. For example, a linear predictor function modeling the characteristics "eye distance," "eye gaze," and "image sharpness" can have a linear combination "ax+by +cz," where a, b, and c are coefficients, and where x, y, and z are respective terms for the characteristics "eye distance," "eye gaze," and "image sharpness."

In particular, coefficients corresponding to a linear combination can be adjusted during the linear regression analysis to weigh some terms more than others. For example, a predictive model for determining whether an image is a live image or a fabricated image can include characteristics "image brightness," "chin position," "age," and "exposure of a face." A linear combination corresponding to this predictive model can be adjusted during the linear regression analysis to assign smaller coefficients to characteristics that are determined to be more relevant to the determination of whether an image is a live image or a fabricated image (e.g., "image brightness" and "exposure of a face") and a larger coefficients to characteristics that are determined to be less relevant to the determination (e.g., "chin position" and "age").

The system 200 identifies, based on the statistical analysis, characteristics that are relevant for discriminating between example images in the first and second data sets (450). As indicated above, a linear combination can be an expression constructed from a set of terms, where each term is multiplied by a coefficient. In some implementations, the system 200 determines that a characteristic is relevant for determining whether an image is a live image or a fabricated image by evaluating a coefficient for a term that corresponds to that characteristic. For example, for linear combination "ax+by +cz," where a, b, and c are coefficients, and where x, y, and z are respective terms for the characteristics "eye distance," "eye gaze," and "image sharpness," the system 200 can determine whether the characteristic "eye distance" is a relevant characteristic by evaluating the coefficient "a".

Figure 6:
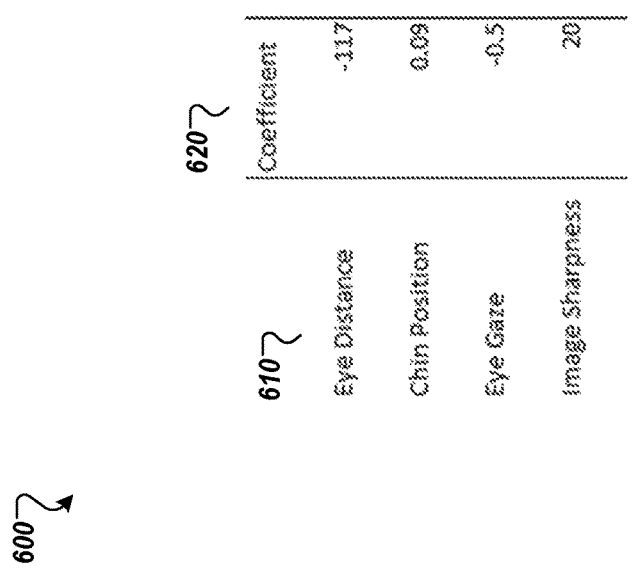
FIG. 6 illustrates exemplary coefficients corresponding to characteristics.

FIG. 6 shows examples of characteristics 610 and their corresponding coefficients 620 as determined based on a statistical analysis. As shown in FIG. 6, the characteristics "eye distance," "chin position," "eye gaze," and "image sharpness," were determined to respectively have the coefficients −117, 0.09, −0.5, and 20.

Referring again to FIG. 4, in some implementations, a characteristic is determined to be relevant for determining whether an image is a live image or a fabricated image if its respective coefficient satisfies a specified threshold. In some implementations, the system 200 identifies a characteristic having a coefficient that is less than or equal to 0.2, 0.3, 0.4, or 0.5 as being relevant for determining whether an image is a live image or a fabricated image. The system can also identify characteristics having respective coefficients that are greater than 0.2, 0.3, 0.4, or 0.5 as being irrelevant for determining whether an image is a live image or a fabricated image.

The system 200 can use characteristics that were determined to be relevant to generate a liveness function for computing liveness scores for new images, as described in reference to FIG. 3. For example, after determining that the characteristics "image brightness," and "exposure of a face" are relevant, the system 200 can compute liveness scores for new images by measuring, in the new images, the characteristics "image brightness" and "exposure of a face," and by computing a liveness score based on those measurements.

In some implementations, the system 200 stores data describing coefficients for characteristics that were identified as being relevant to be used as weights in computing a liveness score. Equation 2 is described above as an example liveness function that uses weights for computing a liveness score.

Other statistical analysis techniques can be used to determine characteristics that are relevant for determining whether an image is a live image or a fabricated image, depending on the implementation. For example, the system 200 may use ordinary least squares regression analysis and various machine learning techniques.

Figure 7:
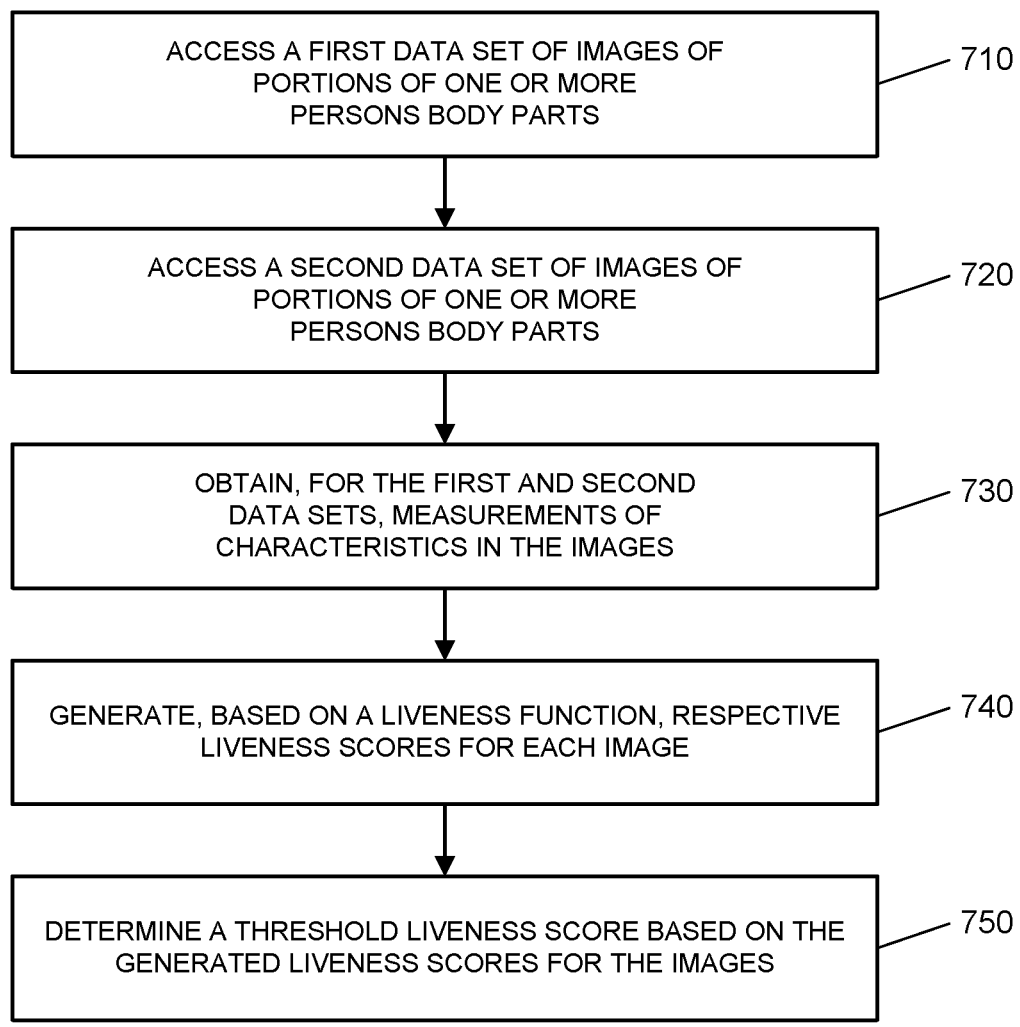
FIG. 7 illustrates an exemplary process for determining a threshold liveness score.

FIG. 7 illustrates a process 700 for determining whether an image is a live image or a fabricated image. The operations of the process 700 are described generally as being performed by the system 200. In some implementations, operations of the process 700 may be performed by one or more processors included in one or more electronic devices.

The system 200 accesses a first data set of example live biometric images (710). For example, the system 200 obtains, from data store 220, biometric images of persons' body parts, such as a left iris image, a right iris image, a facial image, an image of any one or more of the person's fingerprints, an image of the person's handprint, etc. In this example, the biometric images may be captured by one or more devices. The one or more devices may include iris scanners, cameras, fingerprint scanners, hand scanners, or any other type of device capable of capturing a biometric image of a portion of a person's body.

The system 200 accesses a second data set of example fabricated biometric images (720). For example, the system 200 obtains, from data store 220, biometric images that were captured by one or more devices imaging other images of persons' body parts, such as a left iris image, a right iris image, a facial image, an image of any one or more of the person's fingerprints, an image of the person's handprint, etc. The one or more devices may include iris scanners, cameras, fingerprint scanners, hand scanners, or any other type of device capable of capturing a biometric image of a portion of a person's body.

The system 200 obtains, for each image in the first and second data sets, measurements of characteristics that were identified as being relevant (730). The system can obtain data describing characteristics that were identified as being relevant from, for example, a database stored in the data store 220. Relevant characteristics can be determined based on a statistical analysis, as described above in reference to FIG. 4. In some implementations, the system 200 obtains, for each image in the first and second data sets, data describing coefficients corresponding to the relevant characteristics to be used as weights in computing liveness scores.

The system 200 generates, based on a liveness function, respective liveness scores for each image in the first and second data sets (740). In some implementations, a liveness function is configured to generate liveness scores by (i) multiplying respective weights and their corresponding measurements of characteristics and by (ii) aggregating, e.g., adding, the weighted measurements of characteristics. In some implementations, the liveness function is configured to use the characteristics that were determined to be relevant based on the statistical analysis described in reference to FIG. 4.

For example, if the characteristics "face exposure" and "image brightness" were determined to be relevant characteristics based on a statistical analysis, then the liveness function can be configured to generate a liveness score for an image by (i) multiplying respective measurements of the characteristics "face exposure" and "image brightness" present in the image with the characteristics' respective weights and (ii) by aggregating, e.g., adding, the weighted measurements of the characteristics "face exposure" and "image brightness."

Figure 8:
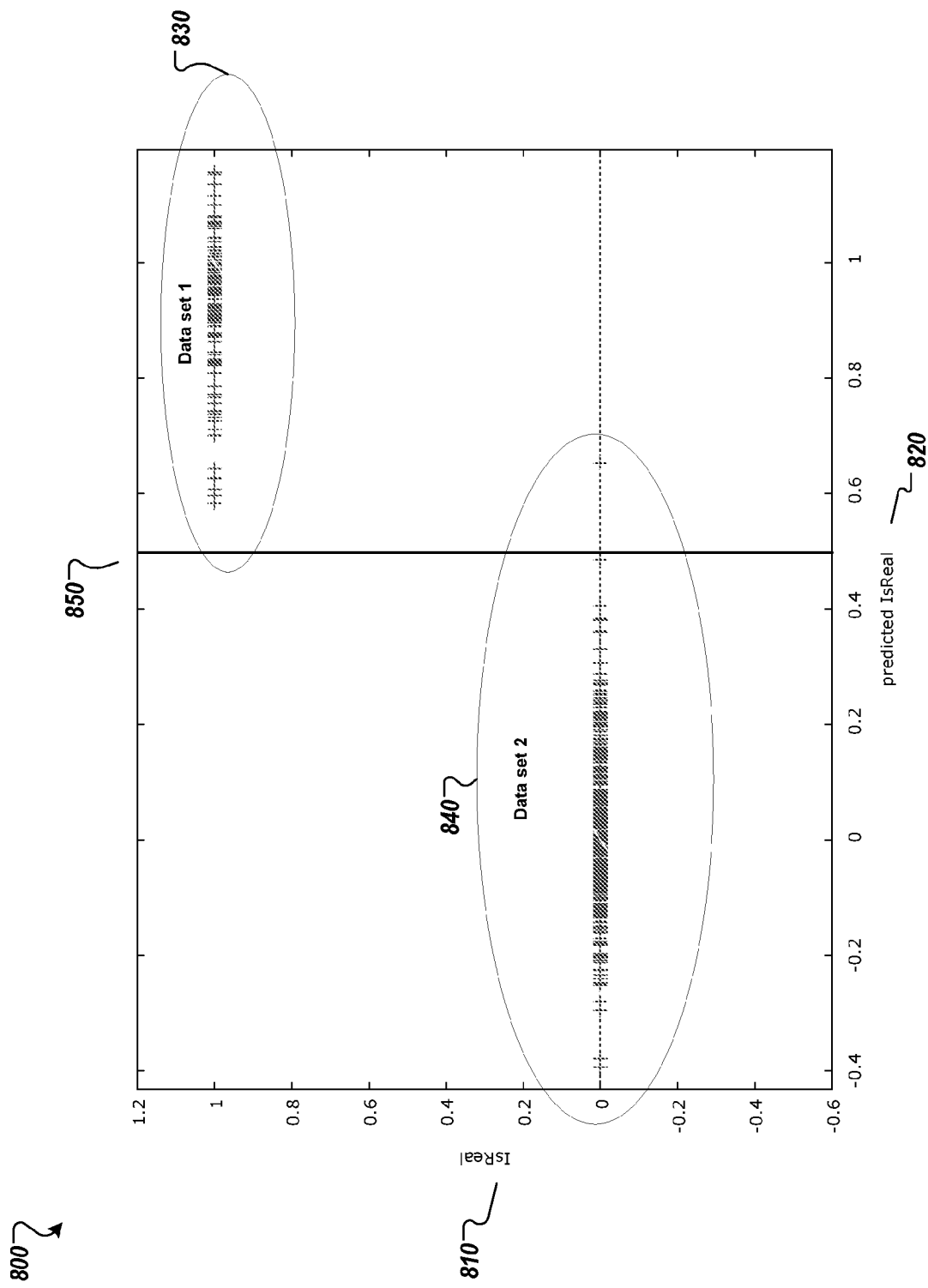
FIG. 8 illustrates an exemplary diagram plotting liveness scores.

The system 200 uses the respective liveness scores for the images in the first and second data sets to determine a threshold liveness score (750). As shown in FIG. 8, a threshold liveness score 850 can be determined by plotting liveness scores for images in the first data set 830 and liveness scores for images in the second data set 840 and selecting a liveness score that best discriminates between liveness scores for images in the first data set from liveness scores for images in the second data set. Liveness scores can be plotted by constructing, for each image in the first and second data sets, an <x, y> data pair, where x represents the image's liveness score, and where y represents a value, e.g., 1 or 0, indicating whether the image is a live image or a fabricated image.

In FIG. 8, data pairs for the live images are plotted as <x, 1> data pairs, where x represents the live image's liveness score, and where y is set to 1 to indicate that the image is a live image. Further, data pairs for the fabricated images are plotted as <x, 0> data pairs, where x represents the fabricated image's liveness score, and where y is set to 0 to indicate that the image is a fabricated image.

A line 850 that best discriminates between data pairs corresponding to live images and data pairs corresponding to fabricated images is drawn along the y-axis. The y-coordinate value that corresponds to the line 850 can be selected as a threshold liveness score. Depending on the implementation, the line 850 may be selected, for example, manually based on human analysis, or based on a mathematical analysis.

In some implementations, a threshold liveness score is determined by specifying a first false spoof detection requirement, e.g., a numeric value or percentage x, e.g., 5 percent, indicating that at most x images, e.g., 5 images out of every 100 images, that are live images are incorrectly classified as fabricated images. A second false non-spoof detection requirement, e.g., a numeric value or percentage y, e.g., 10 percent, indicating that at most y images that are fabricated images, are incorrectly classified as live images, is also specified.

Liveness scores for images in a first data set of example live images and liveness scores for images in a second data set of example fabricated images can be plotted on a graph, as described in reference to FIG. 8. A line is drawn along the y-axis of the graph for each potential threshold value, e.g., threshold values ranging from −0.4 to 1.2, as shown in FIG. 8. For each potential threshold value, the data pairs that were plotted for live images and the data pairs that were plotted for fabricated images, as described in reference to FIG. 8, are evaluated to determine i) a first false spoof detection rate, e.g., a numeric value or percentage indicating that x images that are live images are incorrectly classified as fabricated images, and ii) a second false non-spoof detection rate indicating that y images that are fabricated images, are incorrectly classified as live images.

Each potential threshold value is plotted on a graph, for example, as an <x, y> data pair, where x represents the respective second false non-spoof detection rate that was determined for the potential threshold value, and where y represents the respective first false spoof detection rate that was determined for the potential threshold value. Once each potential threshold value is plotted, an accuracy curve can be determined for plotted potential threshold values. In some implementations, the accuracy curve is determined by applying curve fitting algorithms. The accuracy curve can also be determined using approximation functions, e.g., Quasi-hyperbolic approximation. An approximation function f(x), where x represents the false non-spoof detection rate, can be determined based on the accuracy curve. The values specified for the first false spoof detection requirement and the second false non-spoof detection requirement can be applied to the approximation function f(x) to determine a threshold liveness score.

Thus, for example, for a first false spoof detection requirement of 5 percent and a second false non-spoof detection requirement of 10 percent, the approximation function f(x) would be solved by defining $f(x) \leq 5$ percent, where x is $\geq 90$ percent.

Figure 9:
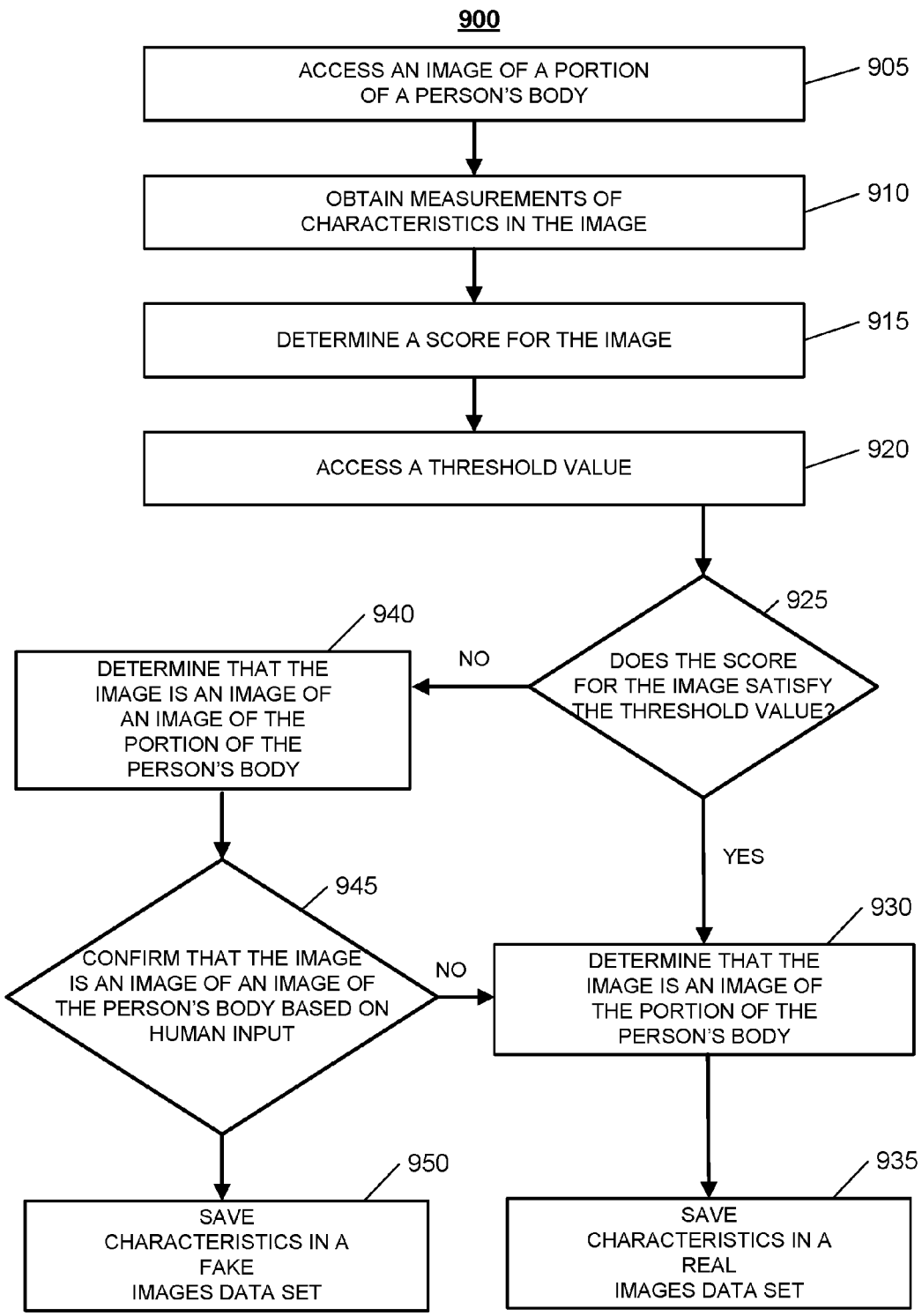
FIG. 9 illustrates an exemplary process for validating a determination of whether an image is a live image or a fabricated image.

FIG. 9 illustrates an exemplary process for validating a determination of whether an image is a live image or a fabricated image. The operations of the process 900 are described generally as being performed by the system 200. In some implementations, operations of the process 900 may be performed by one or more processors included in one or more electronic devices.

The system 200 accesses an image of a portion of a person's body (905). For example, the system 200 receives a biometric image of a person's body part, such as a left iris image, a right iris image, a facial image, an image of any one or more of the person's fingerprints, an image of the person's handprint, etc. In this example, the system 200 may include or communicate with one or more devices that capture biometric images. The one or more devices may include iris scanners, cameras, fingerprint scanners, hand scanners, or any other type of device capable of capturing a biometric image. The system 200 may access the output of any of the one or more devices as the biometric image, in a traditional image format, such as bmp, jpeg, tiff, png, etc.

In some examples, the system 200 accesses the biometric image from data store 220. In these examples, biometric images may be captured over time at a location separate from the system 200 and stored for later processing and identification. The system 200 also may receive the biometric image over a network.

The system 200 obtains measurements of characteristics that are present in the image (910). The system 200 can obtain measurements of characters using, for example, one or more software development kits (SDK) that implement algorithms processes for measuring features, e.g., facial features. For example, for a facial image, the system 200 can obtain measurements of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. The system 200 can also obtain measurements of other characteristics that are present in the image, including a measurement of hot spots, background uniformity, deviation from uniform lighting, average image exposure, gray scale image density, image sharpness, and average luminosity.

The types of characteristics listed above are provided as examples. In particular, the techniques described in this specification can be applied to any characteristic that can be measured in an image.

In some implementations, the system 200 obtains measurements of characteristics in the image that were determined, based on a statistical analysis, as being relevant for determining whether a particular is a live image or a fabricated image, as described in reference to FIG. 4.

The system 200 determines a liveness score for the image (915). For example, the system 200 can compute a liveness score for the image by multiplying or adding the obtained measurements of characteristics that are present in the image, as described above in Equation 1.

In some implementations, the system 200 determines a liveness score for the image by multiplying the measurements of characteristics with their respective weights and aggregating, e.g., adding, the weighted measurements of characteristics together, as described above in Equation 2. Weights for characteristics can be determined based on a statistical analysis, as described in reference to FIG. 4.

The system 200 accesses a threshold liveness score (920). For example, the system 200 accesses the threshold liveness score from data store 220. The threshold liveness score can be determined based on an analysis of liveness scores for live images and fabricated images, as described in reference to FIG. 7.

The system 200 determines whether the computed liveness score for the image to the threshold liveness score satisfies the threshold liveness score (925). For instance, the system 200 compares the computed liveness score to the threshold liveness score and determines whether the computed liveness score is less than, equal to, or greater than the threshold liveness score.

Based on a determination that the liveness score satisfies the threshold liveness score, the system 200 determines that the image is a live image (930). For example, depending on the implementation, the system 200 can determine that the image is a live image based on a determination that the liveness score for the image is greater than or equal to the threshold liveness score. In this example, the system 200 can determine that the image is a fabricated image based on a determination that the liveness score for the image is less than the threshold liveness score. A threshold liveness score can be determined based on an analysis of liveness scores for live images and liveness scores for fabricated images, as described above in reference to FIG. 7.

The system 200 stores data describing the characteristics in the live image in a live images data set (935). In some implementations, the system 200 stores, in a database, a respective image identifier, e.g., a unique identifier for identifying a particular image, respective measurements of one or more characteristics that are in the image, and a respective indicator that indicates that the example image is a live image.

Based on a determination that the liveness score does not satisfy the threshold liveness score, the system 200 determines that the image is a fabricated image (940). For example, depending on the implementation, the system 200 can determine that the image is a fabricated image based on a determination that the liveness score for the image is less than to the threshold liveness score. In this example, the system 200 can determine that the image is a live image based on a determination that the liveness score for the image is greater than or equal to the threshold liveness score.

The system 200 confirms that the image is a fabricated image (945). In some implementations, the image is confirmed as being a fabricated image based on human input. For example, a human can evaluate the image to determine whether the image was correctly classified as a fabricated image. In making this determination, a human can view the image to identify indicia of image fabrication. Once a human determines that the image is a fabricated image, the human can provide input to the system 200 indicating that the image is a fabricated image.

Based on a confirmation that the image is a fabricated image, the system 200 stores data describing the characteristics in the fabricated image in a fabricated images data set (950). In some implementations, the system 200 stores, in a database stored in data store 220, a respective image identifier, e.g., a unique identifier for identifying a particular image, respective measurements of one or more characteristics that are in the image, and a respective indicator that indicates that the image is a fabricated image.

Depending on the implementation, data describing the characteristics in live and fabricated images can be stored in separate databases that correspond to live images and fabricated images, or in one database in which the data is identified as data corresponding to a live image or a fabricated image based on an indicator that indicates whether the image is a live image or a fabricated image.

Based on a confirmation that the image is a not a fabricated image, the system 200 stores data describing the characteristics in the live image in a live images data set. In some implementations, the system 200 stores, in a database stored in data store 220, a respective image identifier, e.g., a unique identifier for identifying a particular image, respective measurements of one or more characteristics that are in the image, and a respective indicator that indicates that the image is a live image.

In some implementations, data describing characteristics in the live images data set and in the fabricated images data set is used to generate a statistical data model, as described in reference to FIG. 4. In some implementations, data describing characteristics in the live images data set and in the fabricated images data set is used to re-generate an updated statistical data model, as described in reference to FIG. 10.

Figure 10:
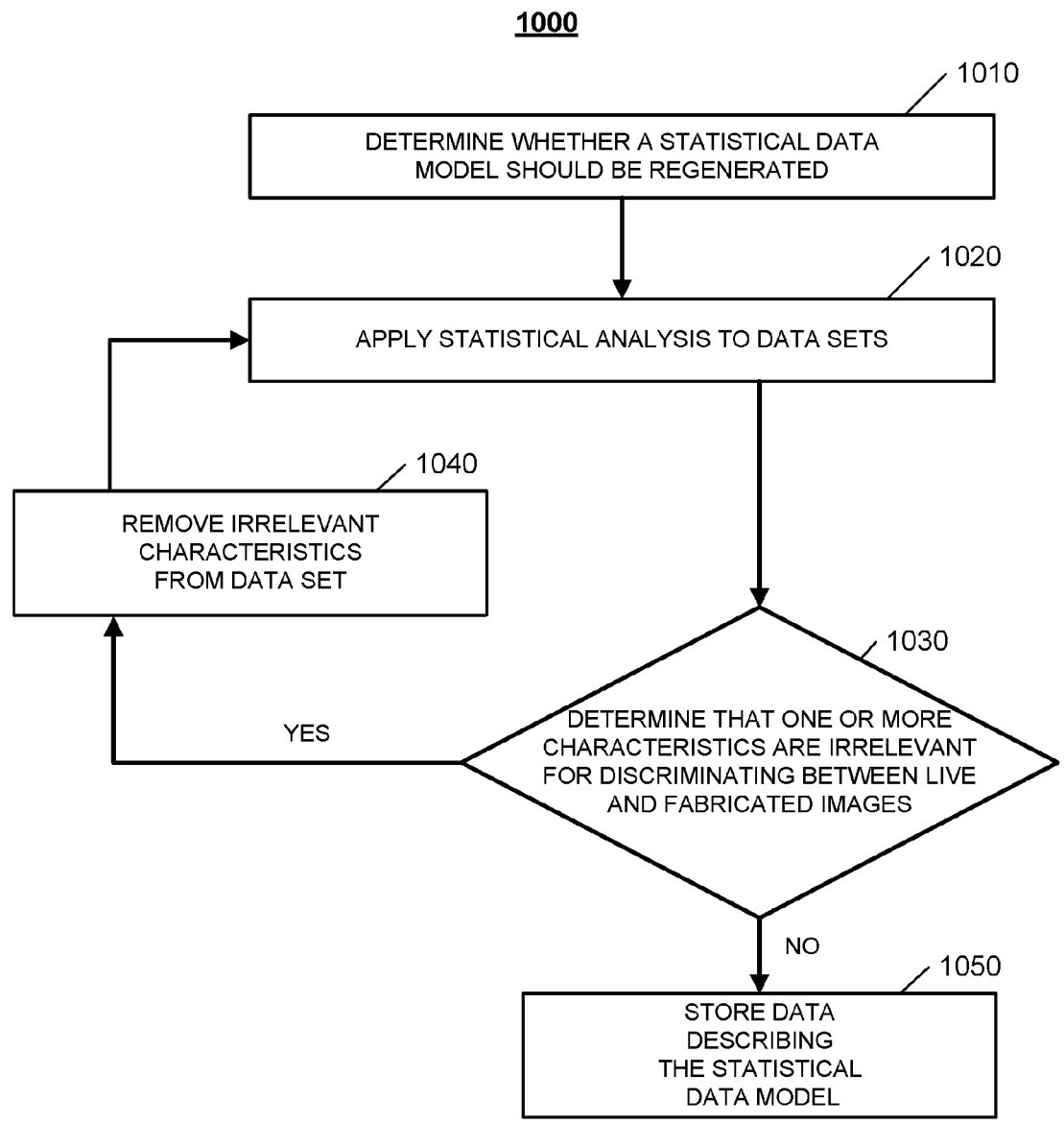
FIG. 10 illustrates an exemplary process for refining a statistical data model.

FIG. 10 illustrates an exemplary process for refining a statistical data model. The operations of the process 1000 are described generally as being performed by the system 200. In some implementations, operations of the process 1000 may be performed by one or more processors included in one or more electronic devices.

The system 200 determines whether a statistical data model for determining whether an image is a live image or a fabricated image should be regenerated (1010). In some implementations, the system 200 determines whether the statistical data model should be regenerated based on a count of images in the live and fabricated images data sets satisfying a threshold count. As described in reference to FIG. 9, the system 200 can store data describing images in a live or fabricated image data set, depending on how those images are classified. The system 200 can compare a count of data entries in the live and fabricated image data sets to a threshold count, e.g., 500, 600, 700, 800, 900, or 1000 images. For example, the system 200 can regenerate the statistical data model when the count of data entries in the live and fabricated image data sets is greater than or equal to a threshold count of 800.

In some implementations, the system 200 determines whether the statistical data model should be regenerated based on a count of unique images in the live images data set satisfying a threshold count. In other implementations, the system 200 determines whether the statistical data model should be regenerated based on a count of unique faces captured in images in the live image data set satisfying a threshold count. Based on a determination that the statistical data model for determining whether an image is a live image or a fabricated image should be regenerated, the system applies a statistical analysis to measurements of the characteristics in the images in the live and fabricated image data sets (1020).

The system 200 can access data describing characteristics in images in the live and fabricated image data sets from, for example, a database stored in the data store 220. The system 200 can apply a second statistical analysis to the data describing characteristics using, for example, the process described in reference to FIG. 4.

The system 200 determines, based on the statistical analysis, whether there are one or more characteristics included in the data describing measurements of characteristics that are irrelevant for determining whether an image is a live image or a fabricated image (1030). Determining whether a characteristic is or is not relevant is described above in reference to FIG. 4. In some implementations, the system 200 is configured to continuously refine the statistical model by performing subsequent statistical analysis until none of characteristics included in the data describing measurements of characteristics are determined to be irrelevant.

Based on a determination that one or more characteristics are irrelevant for determining whether an image is a live image or a fabricated image, the system 200 removes the one or more characteristics from the data describing the characteristics and applies a second statistical analysis (1040). For example, for each image in the live and fabricated image data sets, the system can modify the data describing measurements of characteristics to delete the measurements of characteristics that are determined to be irrelevant.

Based on a determination that none of the characteristics are irrelevant for determining whether an image is a live image or a fabricated image, the system 200 stores the data describing the regenerated statistical data model (1050). In some implementations, the system 200 stores, for example, in data store 220, data describing the characteristics that were not removed for being irrelevant.

For each characteristic that was not removed, the system 200 can also store the characteristic's corresponding coefficient to be used as a weight in computing liveness scores, as described in reference to FIG. 3. As indicated above, a linear combination can be an expression constructed from a set of terms, where each term is multiplied by a coefficient. The system 200 can store coefficients for terms that correspond to characteristics that were determined not to be irrelevant.

Figure 11:
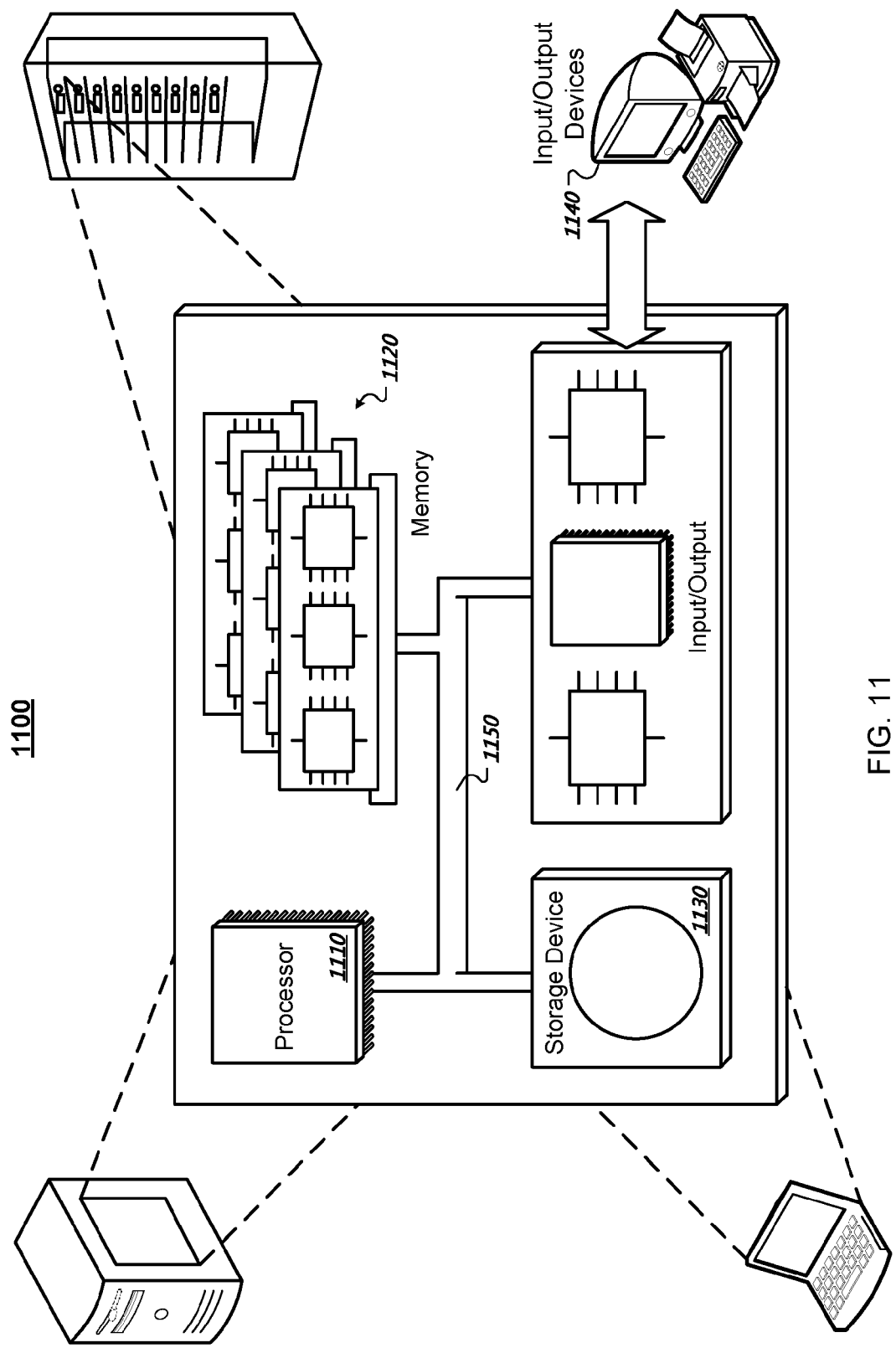

FIG. 11 is a schematic diagram of an example of a generic computer system 1100. The system 1100 can be used for the operations described in association with the processes 300, 400, 700, 900, and 1000, according to some implementations. The system 1100 may be included in the system 200.

The system 1100 includes a processor 1110, a memory 1120, a storage device 2230, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    obtaining training data that includes, for each image of a set of images of one or more portions of a human body, (i) image feature data based on an analysis of the image, and (ii) data indicating whether the image is a live image or a fabricated image;
    using the training data, training a predictive model to determine a likelihood that input image feature data corresponds to the live image that is not the fabricated image, the predictive model including image characteristics and corresponding to a combination of coefficients associated with the image characteristics, the coefficients adjusted based on relevancy of the associated image characteristics in determining whether the image is the live image or the fabricated image;
    obtaining particular image feature data based on an analysis of a particular image, the particular image feature data including measurements of the image characteristics that include facial features of at least a portion of a face shown in the particular image;
    providing the particular image feature data to the predictive model;
    receiving, from the predictive model, data that is determined by applying the predictive model to the particular image feature data including the measurements of the facial features, the data indicating the likelihood that the particular image feature data corresponds to the live image; and
    providing, for output, a representation of the data indicating the likelihood that the particular image feature data corresponds to the live image.

2. The method of claim 1, wherein the data indicating the likelihood that the particular image feature data corresponds to the live image comprises a binary indicator having a first value if the particular image is the live image and a second, different value if the particular image is the fabricated image.

3. The method of claim 1, wherein the particular image feature data based on an analysis of the particular image comprises multiple different characteristics of the particular image and corresponding values for each of the characteristics.

4. The method of claim 1, wherein the particular image feature data comprises measurements of two or more of hot spots, background uniformity, deviation from uniform lighting, average image exposure, gray scale image density, image sharpness, or average luminosity.

5. The method of claim 1, wherein the one or more portions of a human body comprise one or more of an iris, a face, a fingerprint, or a handprint.

6. The method of claim 1, wherein each of the images of the set of images are of a single person.

7. The method of claim 1, comprising:
    receiving an indication of the correctness, or incorrectness, of the data indicating the likelihood that the particular image feature data corresponds to the live image; and
    further training the predictive model using (i) the particular image feature data based on the analysis of the particular image and (ii) the indication of the correctness, or incorrectness, of the data.

8. The method of claim 1, wherein the live image comprises an image taken of a portion of a person's body directly from an image capture device.

9. The method of claim 1, wherein the fabricated image comprises an image taken by an image capture device of an image of a portion of a person's body.

10. A computer-implemented method comprising:
    obtaining training data that includes, for each image of a set of images of one or more portions of a human body, (i) image feature data based on an analysis of the image, and (ii) data indicating whether the image is a live image or a fabricated image;
    using the training data, training a predictive model to determine a likelihood that input image feature data corresponds to the live image that is not the fabricated image, the predictive model including image characteristics and corresponding to a combination of coefficients associated with the image characteristics, the coefficients adjusted based on relevancy of the associated image characteristics in determining whether the image is the live image or the fabricated image; and
    using the predictive model to classify received image feature data as corresponding to the live image or the fabricated image, the received image feature data including measurements of the image characteristics including facial features of at least a portion of a face shown in a received image.

11. The method of claim 10, wherein the data indicating the likelihood that the received image feature data corresponds to the live image comprises a binary indicator having a first value if the received image is the live image and a second, different value if the received image is the fabricated image.

12. The method of claim 10, wherein the received image feature data is based on an analysis of the received image and comprises multiple different characteristics of the received image and corresponding values for each of the characteristics.

13. The method of claim 10, wherein the received image feature data comprises measurements of two or more of hot spots, background uniformity, deviation from uniform lighting, average image exposure, gray scale image density, image sharpness, or average luminosity.

14. The method of claim 10, wherein the one or more portions of a human body comprise one or more of an iris, a face, a fingerprint, or a handprint.

15. The method of claim 10, wherein each of the images of the set of images are of a single person.

16. The method of claim 10, wherein the live image comprises an image taken of a portion of a person's body directly from an image capture device.

17. The method of claim 10, wherein the fabricated image comprises an image taken by an image capture device of an image of a portion of a person's body.

18. A computer-implemented method comprising:

receiving a particular image;

obtaining particular image feature data based on an analysis of the particular image, the particular image feature data including measurements of image characteristics including facial features of at least a portion of a face shown in the particular image;

providing the particular image feature data to a predictive model that is trained to determine a likelihood that input image feature data corresponds to a live image that is not a fabricated image, the predictive model including the image characteristics and corresponding to a combination of coefficients associated with the image characteristics, the coefficients adjusted based on relevancy of the associated image characteristics in determining whether the image is the live image or the fabricated image;

receiving, from the predictive model, data that is determined by applying the predictive model to the particular image feature data including the measurements of the facial features, the data indicating a likelihood that the particular image feature data corresponds to the live image; and providing, for output, a representation of the data indicating the likelihood that the particular image feature data corresponds to the live image.

* * * * *